(12) United States Patent
Hill et al.

(10) Patent No.: US 7,016,897 B2
(45) Date of Patent: Mar. 21, 2006

(54) AUTHENTICATION REFERRAL SEARCH FOR LDAP

(75) Inventors: Reginal Raynard Hill, Round Rock, TX (US); Shaw-Ben Shepherd Shi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1105 days.

(21) Appl. No.: 09/751,248

(22) Filed: Dec. 29, 2000

(65) Prior Publication Data

US 2002/0087718 A1    Jul. 4, 2002

(51) Int. Cl.
 *G06F 17/30*   (2006.01)
(52) U.S. Cl. .............. 707/9; 707/3; 707/10; 707/104.1; 707/204; 709/227; 709/230; 709/246
(58) Field of Classification Search .................... 707/2, 707/3, 4, 8, 9, 200, 201, 100, 101, 103 R, 707/104.1, 204; 709/227, 230, 246
See application file for complete search history.

(56) References Cited

U.S. PATENT DOCUMENTS

| | | | | |
|---|---|---|---|---|
| 5,625,815 A | | 4/1997 | Maier et al. ................. | 395/608 |
| 5,761,500 A | | 6/1998 | Gallant et al. .............. | 395/610 |
| 5,835,755 A | | 11/1998 | Stellwagen, Jr. ............ | 395/600 |
| 5,842,207 A | | 11/1998 | Fujiwara et al. ............... | 707/7 |
| 6,003,084 A | * | 12/1999 | Green et al. ................. | 709/227 |
| 6,023,464 A | | 2/2000 | Woundy ....................... | 370/352 |
| 6,052,681 A | * | 4/2000 | Harvey ............................ | 707/3 |
| 6,072,904 A | | 6/2000 | Desai et al. ................. | 382/225 |
| 6,085,188 A | | 7/2000 | Bachmann et al. ............. | 707/3 |
| 6,092,061 A | | 7/2000 | Choy ............................. | 707/1 |
| 6,301,589 B1 | * | 10/2001 | Hirashima et al. .......... | 707/204 |
| 6,490,619 B1 | * | 12/2002 | Byrne et al. .................... | 707/3 |
| 6,587,874 B1 | * | 7/2003 | Golla et al. .................. | 707/100 |
| 6,598,057 B1 | * | 7/2003 | Synnestvedt et al. ........ | 707/200 |
| 6,665,725 B1 | * | 12/2003 | Dietz et al. .................. | 709/230 |
| 6,829,654 B1 | * | 12/2004 | Jungck ........................ | 709/246 |

OTHER PUBLICATIONS http://developer.netscape.com/docs/manuals/directory/deploy30/aci.htm, *Planning Security Policies*, Dec. 13, 2000, pp. 1-15.
http://developer.netscape.com/docs/manuals/directory/deploy30/referral.htm, *Planning Referrals*, Dec. 13, 2000, pp. 1-5.
Datta, Nikhil, *Understanding LDAP*, Jun. 19, 2000, Oct. 5, 2000, http://www.linuxdoc.org/HOWTO/LDAP-HOWTO-1.html.
Morana, Marco, *Browser-Based Directory Access through LDAP and COM*, Jul. 2000, pp. 34-49.
*Synchronization and Relaxed Coherency in Distributed Data*, Research Disclosure Jan. 1989, p. 82.

* cited by examiner

*Primary Examiner*—Shahid Al Alam
(74) *Attorney, Agent, or Firm*—Duke W. Yee; Jeffrey S. LaBaw

(57) ABSTRACT

A method, program and system for authenticating LDAP referral searches are provided. The invention comprises receiving a bind request from a LDAP referred search request and then searching the local directory for an entry corresponding to the distinguished name (DN) of the bind request. If an entry for the bind DN is located within the local directory, the bind request is authenticated. If an entry for the bind DN is not found in the local directory, a defined reference server is checked for the prefix of the bind DN. If the prefix for the bind DN is located in the reference server, the reference server is contacted for authentication, which is performed using a root DN. If an entry for the bind DN is not found in either the local directory or reference server, the bind request cannot be authenticated and is denied.

6 Claims, 2 Drawing Sheets

AUTHENTICATION REFERRAL SEARCH FOR LDAP

BACKGROUND OF THE INVENTION

1. Technical Field

The present invention relates to computer network environments. More specifically, the present invention relates to directory services within a computer network.

2. Description of Related Art

Lightweight Directory Access Protocol (LDAP) is a protocol that facilitates access to specialized directory servers within a computer network. LDAP provides a referral model which allows client computers to ask an LDAP server a question and be told to contact another server. The contacted server can return any of the requested information which it possesses. In addition, the contacted server returns a list of other servers which might contain the requested information. The LDAP clients, in this case, are responsible for contacting all of the other servers to complete the search request.

One of the major problems associated with the referral mechanism is that the user needs to bind to other servers, with different Distinguished Names (DN's) existing on these servers. Without this binding, the referred search becomes an unauthenticated request. Unauthenticated requests make managing multiple directories impossible.

Therefore, it would be desirable to have a method which allows a user to manage information stored on all servers without having his or her account physically reside on every server.

SUMMARY OF THE INVENTION

The present invention provides a method, program and system for authenticating LDAP referral searches. The invention comprises receiving a bind request from a LDAP referred search request and then searching the local directory for an entry corresponding to the distinguished name (DN) of the bind request. If an entry for the bind DN is located within the local directory, the bind request is authenticated. If an entry for the bind DN is not found in the local directory, a defined reference server is checked for the prefix of the bind DN. If the prefix for the bind DN is located in the reference server, the reference server is contacted for authentication, which is performed using a root DN. If an entry for the bind DN is not found in either the local directory or reference server, the bind request cannot be authenticated and is denied.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
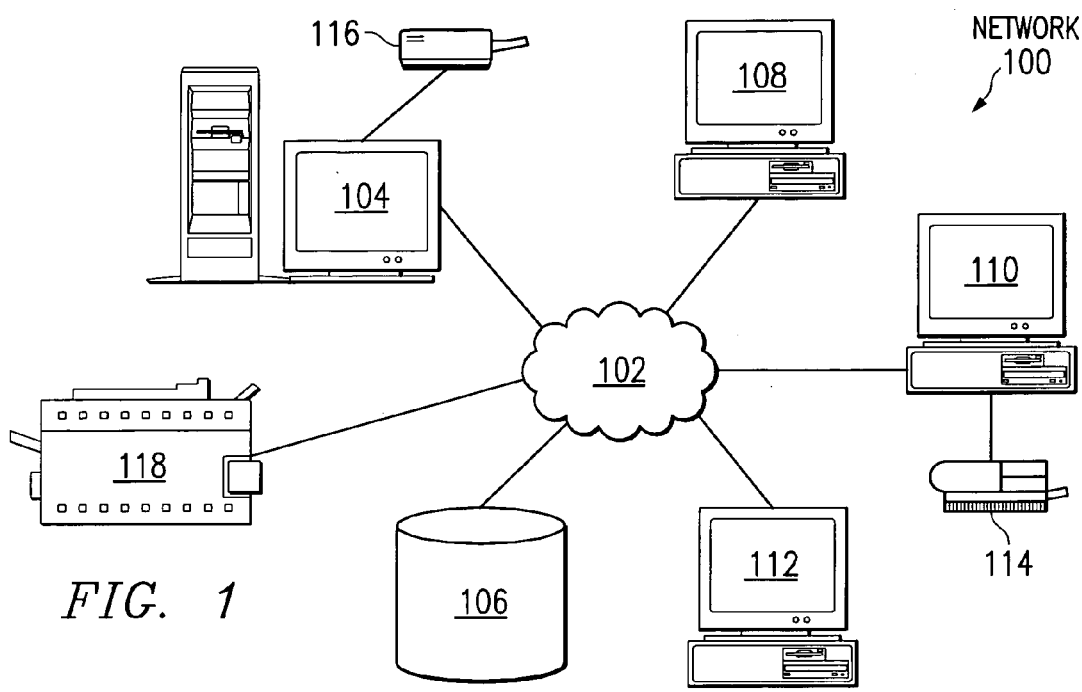
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
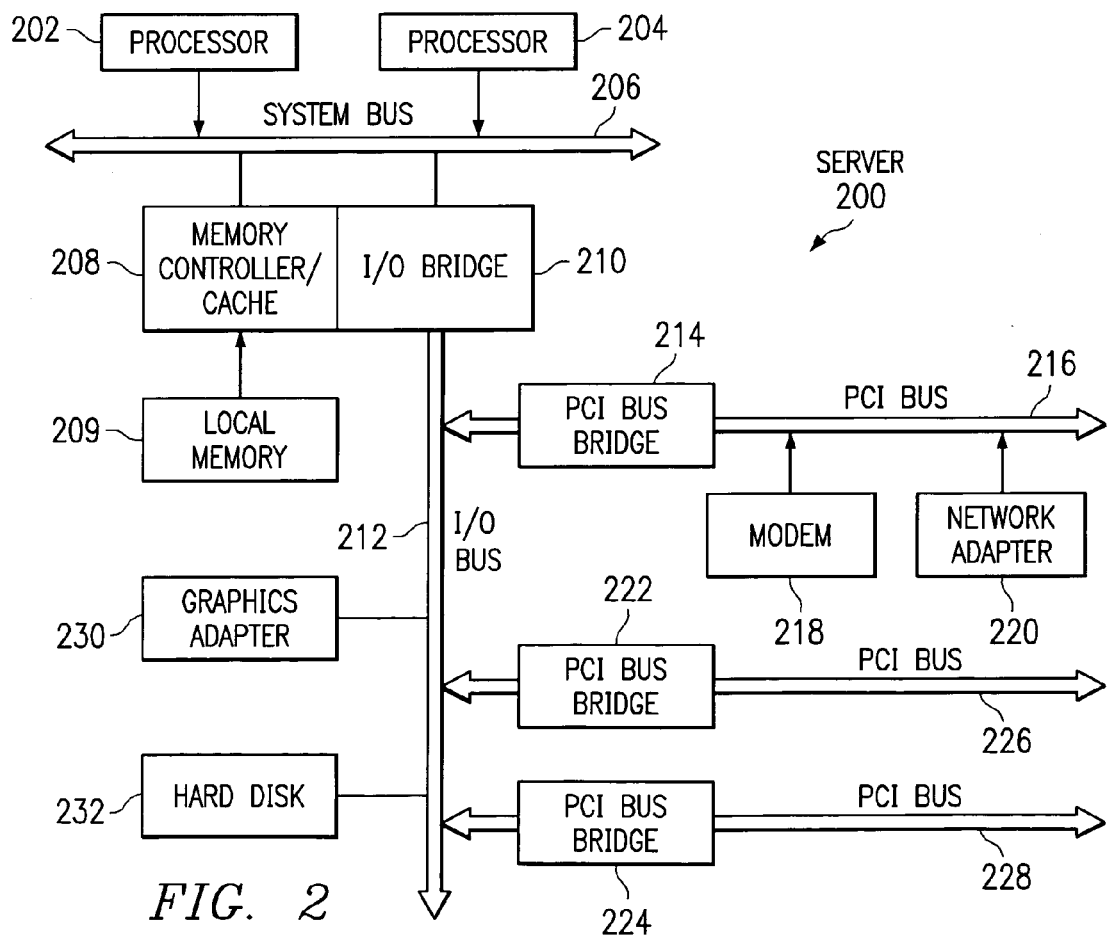
FIG. 2 depicts a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
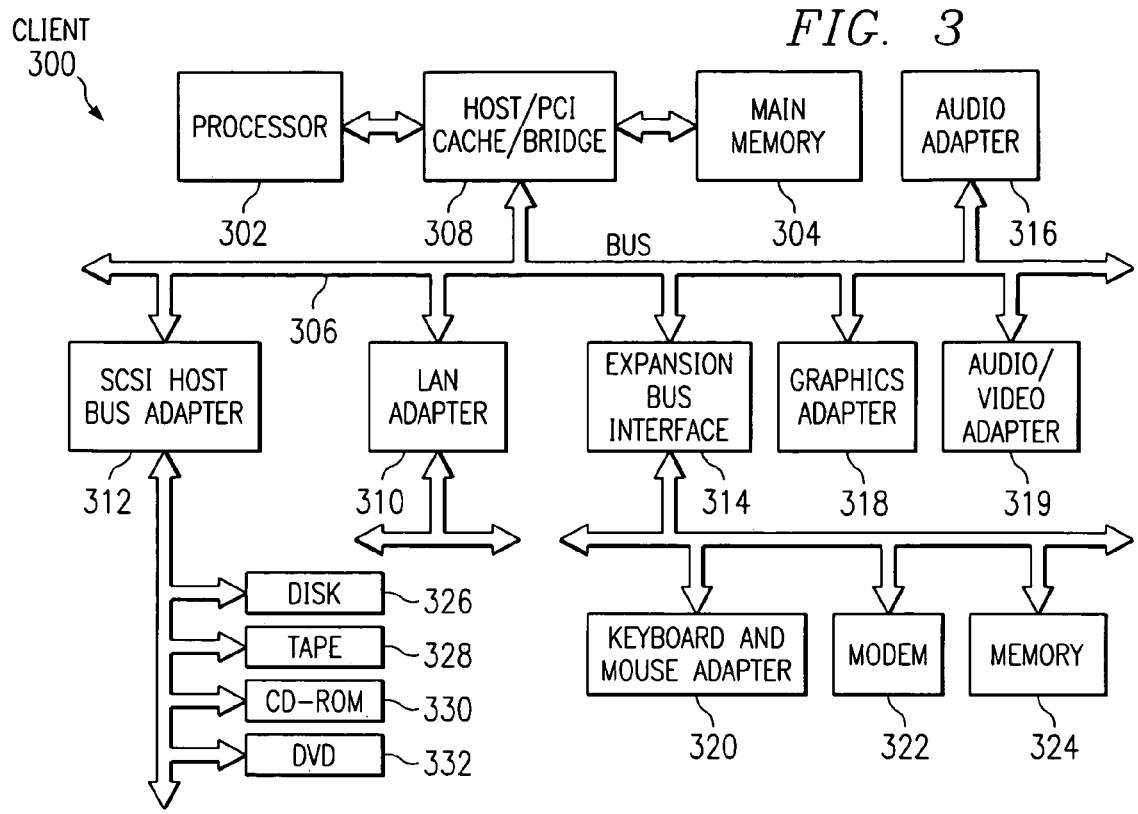
FIG. 3 depicts a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Lightweight Directory Access Protocol (LDAP) is used to access directory services in a computer network. Directory services serve as central repository for searching, adding, deleting and modifying data. The original directory services specification was X.500, which heavily consumes network and system resources. LDAP was established primarily to enable less powerful clients to access X.500 services. LDAP provides an application program interface (API) for accessing directory services, querying, reading and writing data.

Before a client can access a directory's contents, it must authenticate (bind) to the directory. In general, bind consists of providing a user ID and password. In the case of a LDAP directory, the user ID is referred to as a distinguished name (DN). The DN used to bind to a directory is the bind DN, which usually corresponds to the name of an entry in the directory. The entry corresponding to the bind DN will represent a person or an organization. The bind DN and the corresponding password must be known to the directory.

Figure 4:
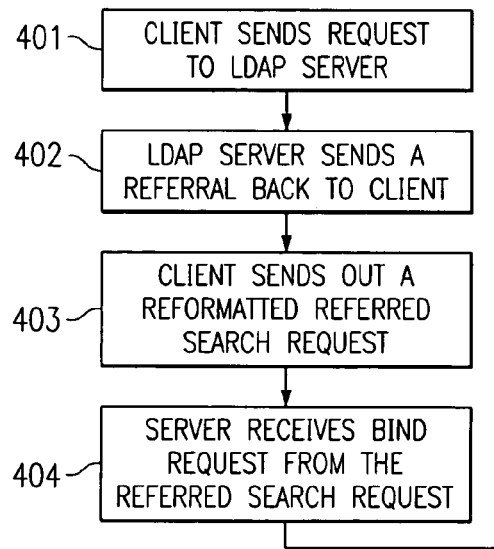
FIG. 4 depicts a flowchart illustrating an authenticated referral search in accordance with the present invention.
Figure 4:
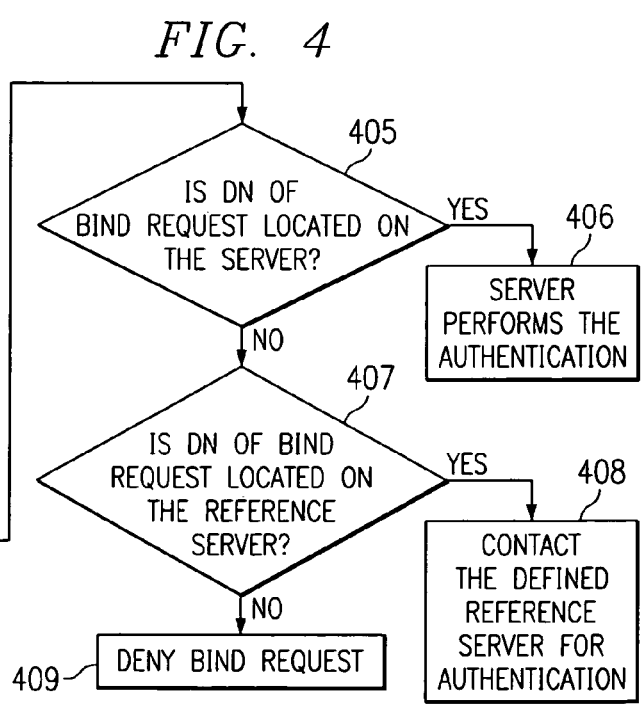

Referring now to FIG. 4, a flowchart illustrating an authenticated referral search is depicted in accordance with the present invention. The process begins when a client computer sends a request to a LDAP server (step 401). LDAP directory service is based on a client-server model. When a LDAP client connects to a LDAP server, the server either responds with the answer or with a pointer to where the client can get more information, which is typically another LDAP server.

The present invention relates to referral searches. Therefore, the next step is for the LDAP server to send a referral back to the client (step 402). A referral is a redirection that the directory service returns when the client requests a directory entry that does not exist on the local server. This referral will list servers within the network that contain information that the client is seeking. The directory server will determine whether to return a referral by comparing the DN of the requested directory object against the directory suffixes supported by the local server. If the DN does not match the suffixes, a referral is returned to the client.

The referral might take the form of a "smart" referral. Essentially, a smart referral maps a directory entry or directory tree to a specific LDAP uniform resource locator (URL). This allows a directory to be scaled across multiple server without physically containing those directory entries on each server. All that is required is a referral from one entry in the local directory to an entry on some other server.

When a client is returned a referral, it automatically reformats the original LDAP request to fit the boundaries set by the referral. The client then reissues the request (step 403).

In addition to the referral entries which can be configured on the LDAP server, users can define reference servers for authenticating a client, through binding. Binding establishes a software connection between one protocol and another. Essentially, the following information is put on a server: 1) root DN's, which are the subtrees that the server is handling, and 2) server location, which is the host name and port that the server is listening to. The root DN is the distinguished name for a privileged directory user. After authentication, the root DN has complete access to the directory, regardless of access controls.

Access to a directory can be controlled with Access-Control Lists (ACLs) that are composed of a series of one or more access-control information (ACI) statements that either allow or deny certain permissions (i.e. read, write, search, compare) to specified entries and their attributes. ACL can be used to set permissions for: the entire directory, a particular subtree, specific entries, and any entry that matches a given LDAP search filter. Search filters allow administrators to set types of access for widely scattered entries that contain common attribute values.

Targets specify the entry or attribute to which an ACI applies. An ACI can target only one entry, but multiple attributes. Permissions define the type of directory access set by the ACI. Examples of permissions include read, write, search, add, delete, and compare. Bind rules indicate the bind DN's to which the permissions apply. A bind rule may also specify a filter. If the filter is true for the binding client, then the ACI applies to the client.

When a server receives a bind request from a referred search request (step 404), the server will first determine if an entry for the bind DN is located locally on the server itself (step 405). If the DN is on the server, then the server performs the authentication of the referred search request itself (step 406).

If the DN cannot be located on the server, the server then checks the defined reference servers (step 407). If a prefix is found, the server contacts the defined reference server for authentication (step 408). Authentication through the reference server is based on the root DN stored on the server, which allows access to the rest of the directory after the authentication of the root DN itself.

If a user attempts to modify an entry and is referred to another LDAP URL, the client will attempt to reformat the modification request to fit the boundaries set by the referrals. For example, if a user is issuing the modification request for o=IBM, ou=Austin, cn=AdminHost1 and the request is referred to Host2, the LDAP server on Host2 will check the referred server entry stored on the directory server and find that Host1 contains the subtree. The rebind request will be forwarded to Host1 for processing and the user will be authenticated with the user information stored on Host1.

If a prefix is not found on the defined reference server, and authentication cannot be performed, the bind request from the referred search is denied (step 409).

The present invention makes administering multiple directories through referrals possible. In contrast to chaining in X.500, the client is still responsible for chasing the referrals. However, with the trust relationship established through the servers, the user will be able to manage information stored on all servers without having his or her account physically residing on every server.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for authenticating referral searches that are generated responsive to a client receiving referrals from at least one directory server, comprising:

receiving a bind request from a referred search request;

searching a local directory of a server for an entry corresponding to the distinguished name (DN) of the bind request;

authenticating the bind request if an entry for the bind DN is located within the local directory of the server;

checking a defined reference server for the prefix of the bind DN, if the bind DN is not found within the local directory of the server;

contacting the reference server for authentication, if the prefix of the bind DN is located on the reference server, wherein the reference server is contacted by the server; and denying the bind request if both the local directory and the reference server do not contain an entry corresponding to the bind DN.

2. The method according to claim 1, wherein the defined reference server contains:

root DN's; and server location, to enable access by the client to the defined reference server without requiring a physical client account to reside on the defined reference server.

3. A computer program product in a computer readable medium for use in a data processing system, for authenticating referral searches that are generated responsive to a client receiving referrals from at least one directory server, the computer program product comprising:

instructions for receiving a bind request from a referred search request;

instructions for searching a local directory of a server for an entry corresponding to the distinguished name (DN) of the bind request;

instructions for authenticating the bind request if an entry for the bind DN is located within the local directory of the server;

instructions for checking a defined reference server for the prefix of the bind DN, if the bind DN is not found within the local directory of the server;

instructions for contacting the reference server for authentication, if the prefix of the bind DN is located on the reference server, wherein the reference server is contacted by the server; and instructions for denying the bind request if both the local directory and the reference server do not contain an entry corresponding to the bind DN.

4. The computer program product according to claim 3, wherein the defined reference server contains:

root DN's; and server location, to enable access by the client to the defined reference server without requiring a physical client account to reside on the defined reference server.

5. A system for authenticating referral searches that are generated responsive to a client receiving referrals from at least one directory server, comprising:

means for receiving a bind request from a referred search request;

means for searching a local directory of a server for an entry corresponding to the distinguished name (DN) of the bind request;

means for authenticating the bind request if an entry for the bind DN is located within the local directory of the server;

means for checking a defined reference server for the prefix of the bind DN, if the bind DN is not found within the local directory of the server;

means for contacting the reference server for authentication, if the prefix of the bind DN is located on the reference server, wherein the reference server is contacted by the server; and means for denying the bind request if both the local directory and the reference server do not contain an entry corresponding to the bind DN.

6. The system according to claim 5, wherein the defined reference server contains:

root DN's; and server location, to enable access by the client to the defined reference server without requiring a physical client account to reside on the defined reference server.

* * * * *